July 15, 1924.

C. W. HOOVER

HYDRAULIC BRAKE

Filed Sept. 4, 1923

INVENTOR
Charles W. Hoover
BY
Booth & Booth
ATTORNEY

July 15, 1924.

C. W. HOOVER

HYDRAULIC BRAKE

Filed Sept. 4, 1923

INVENTOR
Charles W. Hoover
BY
Booth & Booth
ATTORNEY

Patented July 15, 1924.

1,501,451

UNITED STATES PATENT OFFICE.

CHARLES W. HOOVER, OF SAN FRANCISCO, CALIFORNIA, ASSIGNOR TO GRACE E. ELWOOD, OF OAKLAND, CALIFORNIA.

HYDRAULIC BRAKE.

Application filed September 4, 1923. Serial No. 660,802.

*To all whom it may concern:*

Be it known that I, CHARLES W. HOOVER, a citizen of the United States, residing at city and county of San Francisco, and State of California, have invented certain new and useful Improvements in Hydraulic Brakes, of which the following is a specification.

My invention relates to hydraulic brakes of the type in which a body of fluid is circulated through a more or less restricted path.

The object of my invention is to provide a hydraulic brake which, when not in operation, will have practically no frictional or fluid pressure resistance, but which may be thrown into operation instantly to provide any desired degree of resistance.

The device in which my invention is embodied comprises a rotary pump adapted to circulate a body of fluid through a closed system, and a controllable valve in said system for regulating the pressure of the fluid and therefore the power absorbed by the pump. In this connection it should be noted that the principles of my invention may be applied without change to rotary pumps used otherwise than as brakes, the result being the same, viz., the practical elimination of fluid frictional or pressure losses when the pump is running without load. It is to be understood, moreover, that the device herein described and illustrated may be varied in form and construction, within the scope of the claims hereto appended, without departing from the spirit of the invention.

With this in view a preferred embodiment of my invention will now be fully described with reference to the accompanying drawings, wherein—

Figure 2:
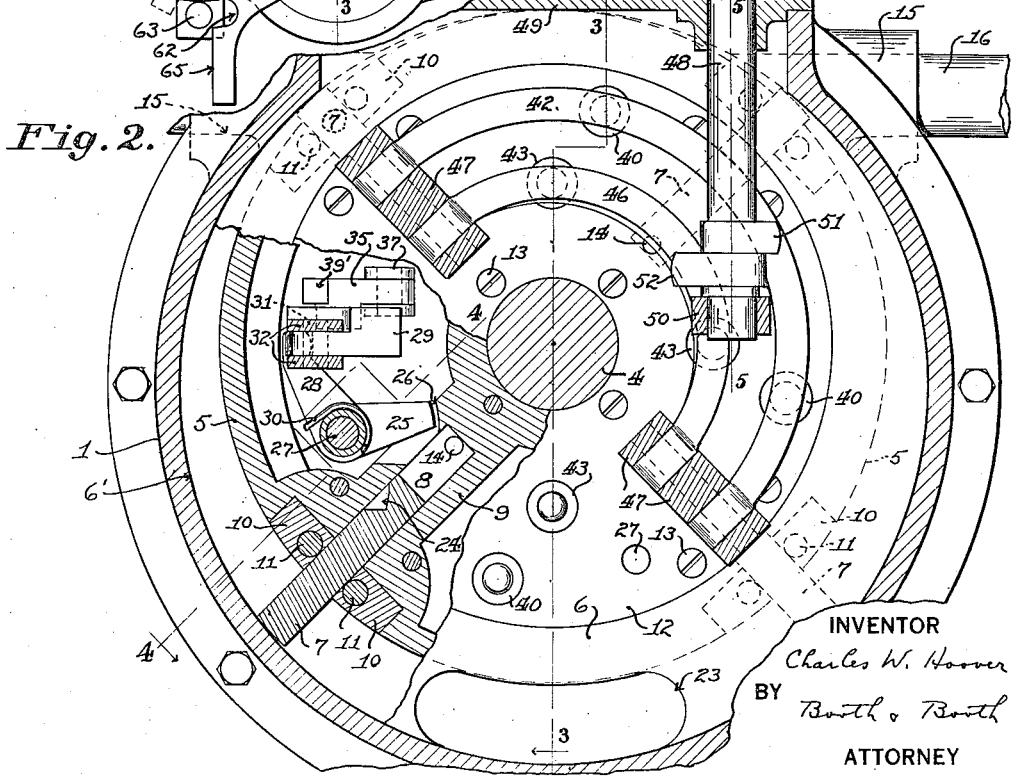
Fig. 2 is a vertical section, partly broken, taken in the direction of the arrow on the line 2—2 of Fig. 1.
Figure 5:
Figure 5:
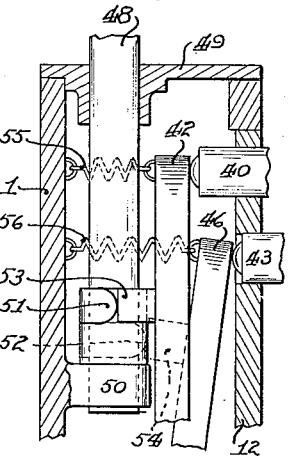
Figure 4:
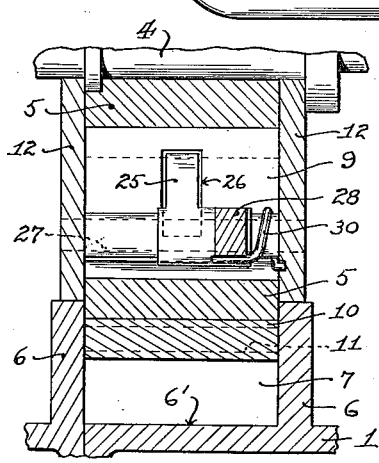

Figs. 4 and 5 are sectional details taken in the direction of the arrows on the respective lines 4—4 and 5—5 of Fig. 2.

Figure 6:
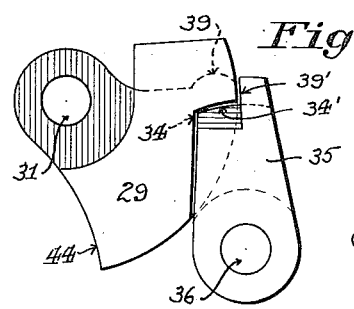

Fig. 6 is a detail, enlarged, of one of the latch operating dogs and the holding pawl therefor.

Figure 7:
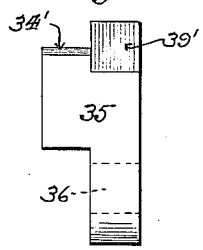

Fig. 7 is a detail, enlarged, of the latch holding pawl.

In the drawings, the reference numeral 1 designates a stationary casing, which is formed in two portions joined together on the line 2, and provided with a clamp 3 for securing it to a fixed support (not shown). A shaft 4 is journaled eccentrically in the casing 1, and has fixed upon it rotor 5, which runs between spaced annular flanges 6 projecting inwardly from said casing. The rotor 5 carries a number (four are shown in the drawings) of substantially radially disposed sliding pistons or vanes 7 which travel in the eccentric working cylinder or channel 6' formed between the casing flanges 6, as shown in Fig. 4, moving in and out, as the rotor revolves, in guide slots 8, Fig. 2, formed in the spokes 9 of said rotor. To prevent the vanes 7 from sticking, I provide bronze bearing blocks 10 at the outer ends of the guide slots 8, and mount freely rotatable rollers 11 therein. The sides of the rotor 5 are closed by circular plates 12, Figs. 2 and 3, secured to said rotor by screws 13, and fitting closely within the casing flanges 6. Holes 14, Fig. 2, are provided in said plates 12 to vent the inner ends of the vane guide slots 8. The vanes 7 are held in firm sliding contact with the periphery of the working cylinder 6' by centrifugal force when the rotor 5 is revolving at any except a very slow speed. If the device is to be used, however, at slow speeds, it may be desirable to employ springs to force the vanes 7 outwardly, but as the use of such springs is common practice in rotary pumps of the sliding vane type, they have been omitted from the drawings for the sake of simplicity.

Figure 1:
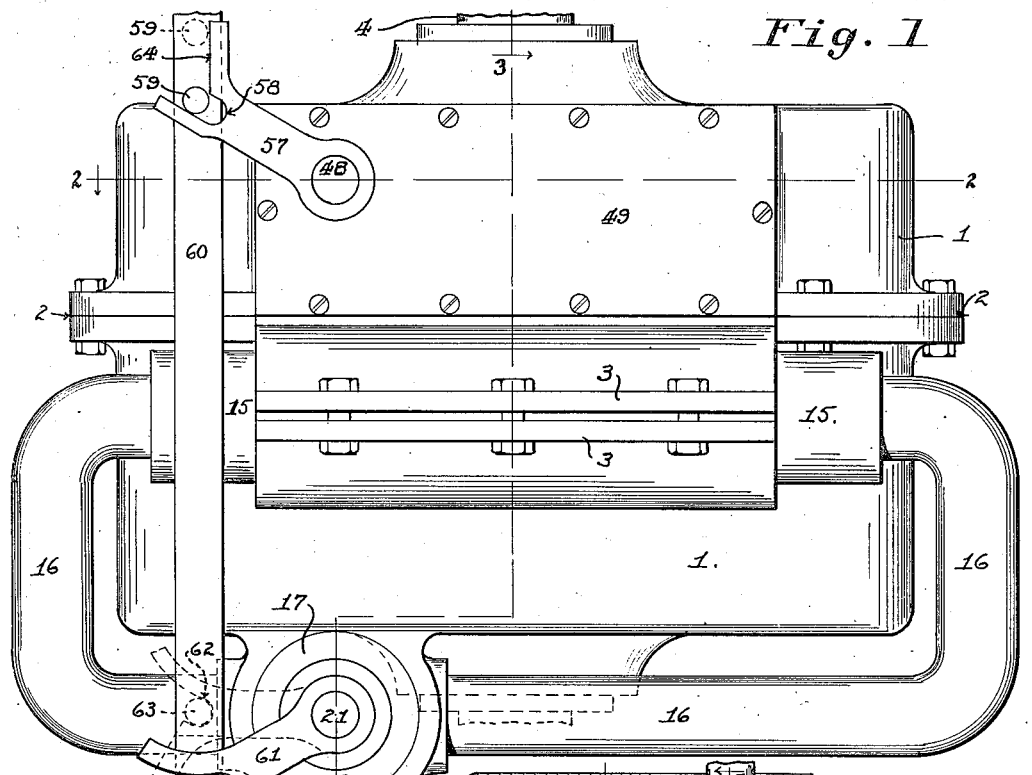
Fig. 1 is a plan view of my hydraulic brake.
Figure 3:
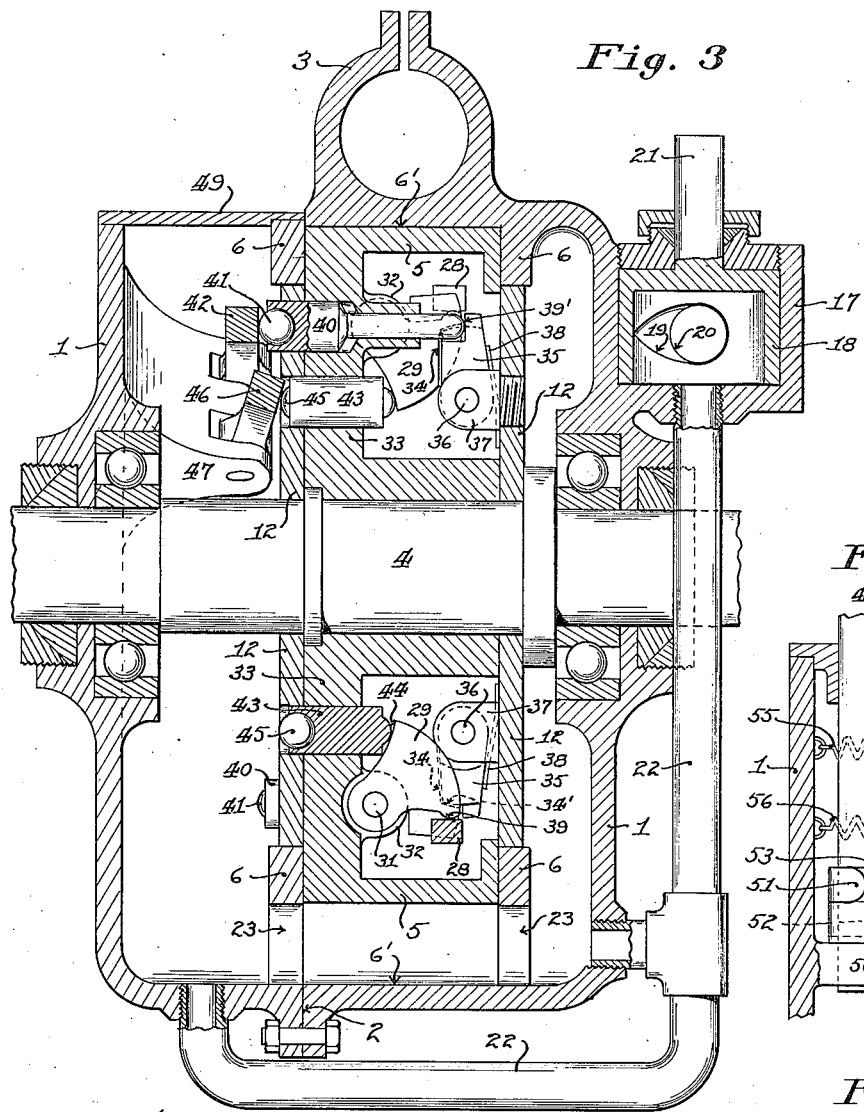
Fig. 3 is a transverse vertical section taken approximately on the line 3—3 of Figs. 1 and 2 and viewed in the direction of the arrows.

The casing 1 is provided with tangential fluid connections 15, Figs. 1 and 2, either one of which may be the inlet and the other the outlet, depending on the direction of rotation of the shaft 4. Said fluid connections communicate with the working cylinder or channel 6' between the casing flanges 6, so that the fluid is drawn into said channel by the vanes 7 through one of said connections and forced out through the other. The connections 15 are joined by an exterior pipe 16, Fig. 1, in which is a control valve 17. Said valve has an interior movable member or core 18, Fig. 3, provided in the sides with apertures, one of which is shown at 19, adapted to move into and out of registry with apertures 20 formed in the housing member 17 and communicating with the pipes 16. Thus by turning the valve core 18, by means of its stem 21, the flow of fluid in the pipe 16 may be more or less restricted, thereby loading the pump to the desired extent. The lower end of the valve core 18 is open, and is connected by pipes 22 with the lower portions of the casing 1 on both sides of the flanges 6, as shown in Fig. 3, said casing thus forming a reservoir which is kept filled with the working fluid. Apertures 23 are formed in the lower portions of the flanges 6 through which fluid may be drawn into the working channel or cylinder 6′, to prevent air pockets or voids.

In order to eliminate the friction of the fluid flowing through the pipes 16 and the valve 17 when no load is desired and said valve is fully open, I have provided means for holding the vanes 7 retracted within their guide slots 8, so that no fluid is circulated and the rotor runs freely without resistance. For this purpose I provide each vane 7 with a notch 24, Fig. 2, which may be engaged by a latch 25, operating through a slot 26 in the rotor spoke 9. The latch 25 is carried upon a pin 27 extending across between the rotor side plates 12, as shown in Figs. 2 and 4, and has an arm 28 extending laterally and adapted to be engaged and moved by a dog 29. A spring 30 normally holds the latch 25 in engagement with the notch 24 of the vane 7, the dog 29 holding said latch out of engagement with said notch.

The dog 29 is pivotally mounted at 31, Figs. 2 and 3, between a pair of lugs 32 projecting laterally from a spoke like portion 33 of the rotor 5, and is provided with a notch 34, Figs. 2, 3 and 6, adapted to be engaged by a pawl 35. Said pawl, which is shown in Figs. 2, 3, 6 and 7, is pivotally mounted at 36 in a lug 37 secured to the rotor side plate 12 opposite the spoke like rotor portion 33, and is normally held in engagement with the notch 34 of the dog 29, as shown, by a spring 38. When said pawl is in engagement with said notch, as shown, the dog 29 is held in such a position that the latch 25 is held, by means of the engagement of its arm 28 with said dog, out of engagement with the notch 24 of the vane 7, and said vane is therefore free to move in and out. The dog 29 is formed with a rounded face 39 adapted to engage the arm 28 of the latch 25.

The pawl 35 is provided with a recessed face 39′, laterally offset from the portion 34′ which engages the notch 34, and said face 39 is adapted to be engaged by the end of a transversely slidable plunger 40, Fig. 3, mounted in the spoke like rotor portion 33. Said plunger extends through the rotor side plate 12, and has a ball 41 in its outer end adapted to engage and travel over the face of a cam 42. A second transversely slidable plunger 43 is similarly mounted in the rotor portion 33, and is adapted to engage the face 44 of the dog 29. Said second plunger 43 is similarly provided with a ball 45 adapted to engage and travel over the face of a cam 46. The cams 42 and 46 are substantially semi-circular concentric bars, as shown in Fig. 2, and are pivotally mounted at their ends, in lugs 47 projecting inwardly from the end member of the casing 1. Said cams therefore do not rotate with the rotor 5, but have a slight lateral swinging movement toward and away from said rotor, the inner cam 46 being shown in Figs. 2, 3 and 5 as swung toward the rotor, while the outer cam 42 is shown at the opposite limit of its movement.

It will be seen that, as the rotor revolves, the plungers 40 and 43 are caused to ride upon the faces of the respective cams 42 and 46 during a portion of each revolution of said rotor. If the inner cam 46 be swung toward the rotor, as shown, the plungers 43 will be successively forced inwardly as each rides upon said cam. This inward movement of each plunger 43 moves the corresponding dog 29, which in turn lifts the latch 24 out of engagement with the notch 24 in the vane 7. At the same time, the pawl 35, engaging the notch 34, retains the dog 29 and the latch 25 in this position, all as shown in the drawings. If, however, the inner cam 46 be swung outwardly to a vertical position, and the outer cam 42 be swung inwardly toward the rotor, the plungers 40 will be successively forced inwardly, as each rides upon said cam 42. This inward movement of the plungers 40 releases the pawls 35 from the notches 34 of the dogs 29, so that the latches 25 may be moved, by their springs 30, into position to engage the notches 24 of the vanes 7. Then, as said vanes are successively forced inwardly by their contact with the eccentric periphery of the cylinder or working channel 6′, they are engaged by said latches 25 and retained in their retracted, or inoperative positions. At the same time, the movement of the latches 25, operating through the dogs 29, moves the plungers 43 outwardly. Thus by swinging the outer cam 42 toward the rotor, the vanes 7 are successively held in their retracted or inoperative positions, and by swinging the inner cam 46 toward said rotor, said vanes are instantly released, as each passes a given point in the revolution of the rotor, to become operative and take up the load.

The cams 42 and 46 are swung by means of a vertical shaft 48, Figs. 2 and 5, journaled in the cover plate 49 of the casing 1 and in a lug 50 projecting inwardly from the end wall of said casing. Said shaft 48 has a pair of oppositely disposed fingers 51 and 52, adapted to bear against lugs 53 and 54 projecting respectively from the backs of the cams 42 and 46. Thus when the shaft 48 is turned in one direction the cam 42 is swung inwardly, and when said shaft is turned in the opposite direction the cam 46 is swung inwardly and the cam 42 is allowed to return to its outward or vertical position. Springs 55 and 56, Fig. 5, respectively, hold the cams 42 and 46 in their outward or vertical positions.

The shaft 48 is turned by means of an arm 57, Fig. 1, secured to its upper end outside the casing 1. Said arm has a slot 58 adapted to be engaged by a pin 59 projecting upwardly from a longitudinally slidable bar 60. Said bar, which may be supported in any suitable guides not shown in the drawings, also operates the core 18 of the fluid control valve 17. For this purpose the stem 21 of said valve core has an arm 61, provided with a slot 62, adapted to be engaged by a pin 63 secured to the bar 60. The arms 57 and 61 are provided with locking faces 64 and 65 respectively, against which the pins 59 and 63 are adapted to bear, in order to cause said arms to be operated successively, but not simultaneously by a continuous movement of the bar 60. Thus, starting from the position shown in dotted lines, the movement of the bar 60 to the position shown in full lines will have no effect on the arm 57 of the cam operating shaft 48, the pin 59 riding along the locking face 64, but the valve operating arm 61 will be moved from the dotted line to the full line position, the pin 63 engaging the slot 62. This movement of the valve arm 61 carries the valve from its closed to its open position, thereby reducing the load from the maximum to that caused only by the friction of the fluid in its open circulating system. The continued movement of the bar 60 then moves the arm 57, the pin 59 engaging the slot 58, but has no effect on the valve arm 61, the pin 63 riding along the locking face 65. Thus the valve remains in its open position while the movement of the arm 57 causes the vanes of the pump to be held in their retracted, or inoperative position, as described above, to allow the rotor to run freely without any resistance whatever. The opposite movement of the bar 60 first releases the vanes to their operative positions, and then gradually closes the valve 17 to increase the load.

Thus the entire control of the device is effected by the single and progressive movement of the bar 60.

I claim:

1. In a hydraulic brake, a pump comprising a working cylinder; a rotor therein; a substantially radially disposed fluid impelling member adapted to be extended from and retracted into said rotor in following said cylinder; and a latch adapted to engage said member when retracted to hold the same in its retracted position.

2. In a hydraulic brake, a pump comprising a working cylinder; a rotor eccentrically mounted therein; a substantially radially disposed movable vane carried by said rotor and adapted to fit within and follow said cylinder; and means for holding said vane out of contact with said cylinder.

3. In a hydraulic brake, a pump comprising a working cylinder; a rotor eccentrically mounted therein; a fluid impelling vane carried by said rotor and adapted to move into and out of said rotor in following said cylinder; and means for retaining said vane in its retracted position.

4. In a hydraulic brake, a pump comprising a working cylinder; a rotor eccentrically mounted therein; a fluid impelling vane carried by said rotor and adapted to move into and out of said rotor in following said cylinder; a latch for retaining said vane in its retracted position; and means for operating said latch during the rotation of said rotor.

5. In a hydraulic brake, a pump comprising a casing having a working cylinder therein; a rotor eccentrically mounted within said cylinder; a fluid impelling vane carried by said rotor and adapted to follow said cylinder; a non-rotatable member carried by the casing; and mechanism carried by said rotor and adapted to coact with said member to hold the vane out of contact with the cylinder.

6. In a hydraulic brake, a pump comprising a casing having a working cylinder therein; a rotor eccentrically mounted within said cylinder; a fluid impelling vane carried by said rotor and adapted to follow said cylinder; a non-rotatable member carried by the casing; mechanism carried by the rotor and adapted to coact with said member to hold the vane out of contact with the cylinder; a second non-rotatable member carried by the casing; and devices carried by the rotor and adapted to coact with said second member to release said vane holding mechanism.

7. In a hydraulic brake, a pump comprising a casing having a working cylinder therein; a rotor eccentrically mounted within said cylinder; a fluid impelling vane carried by said rotor and adapted to follow said cylinder; a non-rotatable cam carried by the casing; a latch for holding said vane in inoperative position; and devices carried by the rotor and adapted to be actuated by said cam to operate said latch.

8. In a hydraulic brake, a pump comprising a casing having a working cylinder therein; a rotor eccentrically mounted within said cylinder; a fluid impelling vane carried by said cylinder and adapted to follow said cylinder; a latch for holding said vane in inoperative position; a non-rotatable shiftable cam carried by the casing; devices carried by the rotor and adapted to be actuated by said cam to operate said latch; and means for shifting said cam into and out of functional position.

9. A hydraulic brake comprising a working cylinder having a fluid inlet and a fluid outlet; a rotor within said cylinder; a fluid impelling member carried by said rotor; means for moving said member, at will, into and out of operative position, and means for variably restricting said fluid outlet.

10. A hydraulic brake comprising a working cylinder having a fluid inlet and a fluid outlet; a connection between said outlet and said inlet; a valve in said connection for variably restricting the area thereof; a rotor within said cylinder; a fluid impelling member carried by said rotor; and means for moving said member, at will, into and out of operative position.

11. A hydraulic brake comprising a working cylinder having a fluid inlet and a fluid outlet; a rotor eccentrically mounted within said cylinder; a substantially radially movable vane carried by said rotor and adapted to fit within and follow said cylinder; means for retaining said vane, at will, out of contact with said cylinder; and means for variably restricting said fluid outlet.

12. A hydraulic brake comprising a casing adapted to contain a supply of fluid; a working cylinder within said casing, said cylinder having a fluid inlet and a fluid outlet and a connection with the fluid containing portion of said casing; a rotor within said cylinder; a fluid impelling member carried by said rotor; means for moving said member, at will, into and out of operative position; and means for variably restricting said fluid outlet.

In testimony whereof I have signed my name to this specification.

CHARLES W. HOOVER.